Sept. 29, 1970 YUKIO MIZUTA ET AL 3,531,625
AUTOMATIC TICKET GATE
Filed March 3, 1967 3 Sheets-Sheet 1
FIG.I.
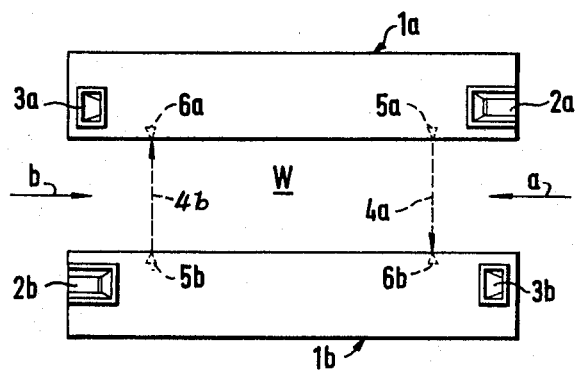
FIG.2.
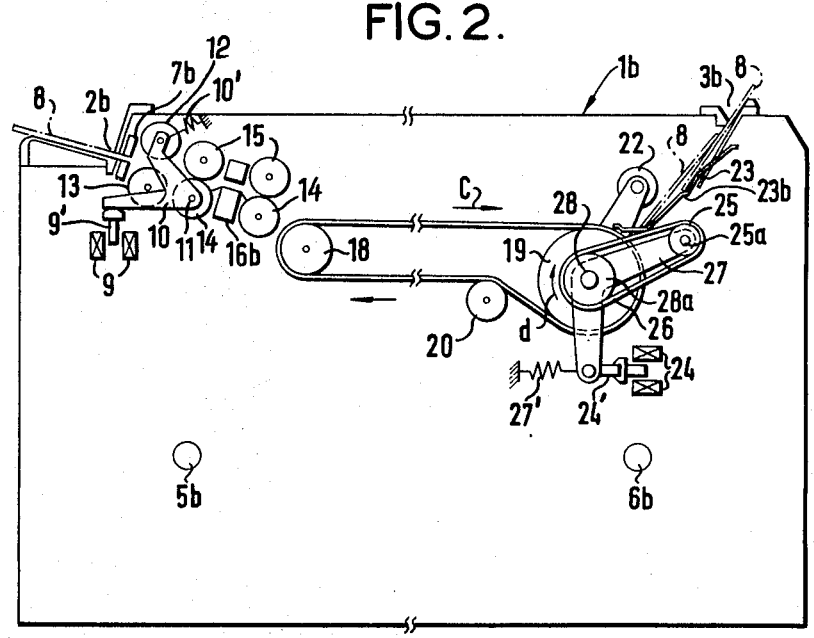
INVENTORS
YUKIO MIZUTA
SHIZUYA ANO
BY TOSHIO TANAKA
TAKEO ASADA
By Christensen, Sanborn, & Matthews
ATTORNEYS United States Patent Office
3,531,625
Patented Sept. 29, 1970

3,531,625
AUTOMATIC TICKET GATE
Yukio Mizuta, Shizuya Ano, Toshio Tanaka, and Takeo Asada, Kyoto, Japan, assignors to Omron Tateisi Electronics Co., Kyoto, Japan, a company of Japan
Filed Mar. 3, 1967, Ser. No. 620,503
Claims priority, application Japan, Mar. 10, 1966, 41/15,003
Int. Cl. G05b 1/00; G06k 5/00; G07f 1/06
U.S. Cl. 235—61.7         10 Claims

ABSTRACT OF THE DISCLOSURE

An automatic ticket gate for rapid examination and return of passenger tickets. The tickets, appropriately coded, may be inserted successively into a ticket inlet and examined by a genuineness tester. A solenoid-operated bell-crank draws the tickets into the gate in response to a signal from the genuineness tester. This signal also actuates driving rollers which convey the tickets past a ticket reader, onto a conveyor belt, and thence to a guide plate which returns the tickets in the order of insertion under control of a solenoid. The signal from the ticket reader is stored, then supplied to an information testing circuit which provides an output signal in response to the signal from the genuineness tester which may be a no ticket, valid ticket or invalid ticket signal. This output signal is gated to a memorizing circuit in response to a signal from a first passenger detector, and supplied from the memorizing circuit to a collation circuit. In response to a gating signal from a second passenger detector, the collation circuit may provide an output signal to either the solenoid for the guide plate, or a warning means, or both. If a valid ticket signal has been memorized, the guide plate is actuated to dispense the ticket. If an invalid ticket signal has been memorized, the ticket is dispensed but the collation circuit additionally actuates the warning means. If no ticket has been inserted, the collation circuit actuates the warning means.

---

This invention relates to an apparatus for automatically examining tickets at a railway station and the like and more particularly to an automatic ticket gate which is capable of receiving a plurality of tickets in rapid succession, examining them with respect to their validity and returning them to their respective owners.

There is known an automatic ticket gate installed at a railway station, wherein a passenger is supposed to insert his ticket into a slot formed in the gate, wherein the ticket is examined with respect to its genuineness and validity and then returned to the passenger from another slot. However, such prior art automatic ticket gates can handle only one ticket at a time. That is, once a ticket has been inserted into the machines, they refuse insertion of another ticket until they have completed the examination of the previous ticket and returned it to the owner. This poses a serious problem in the rush hours when passengers swarm around the gate.

Accordingly, it is one object of the invention to provide an automatic ticket gate which can handle a plurality of tickets inserted in rapid succession.

Another object of the invention is to provide an automatic ticket gate, wherein as a previously inserted ticket is being examined, another ticket may be inserted for examination.

A further object of the invention is to provide an automatic ticket gate which can accept a plurality of tickets in rapid succession and, after examining them, return them to their respective owners in the order they were inserted.

Other objects will become apparent from the following description of a preferred embodiment thereof with reference to the accompanying drawings, wherein:

FIG. 1 is a plan view of two automatic ticket gates of the invention so arranged as to define a gateway at opposite sides thereof;

FIG. 2 is a side view sectioned along line 2—2 of FIG. 1, with the interior mechanism somewhat schematically shown;

Figure 3:
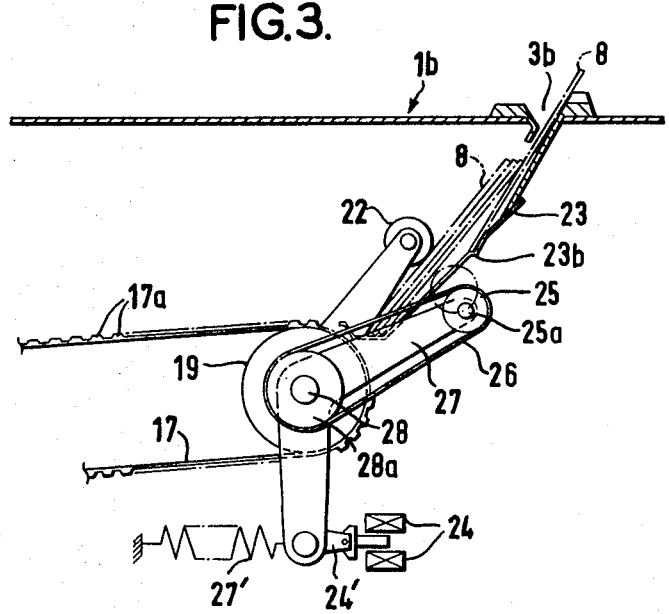
FIG. 3 is an enlarged view of the ticket return slot and its associated parts shown in FIG. 2.

Referring to FIG. 1, there are shown two automatic ticket gates of the invention, generally designated at 1a and 1b, which are of the same construction and arranged so as to define a gateway W therebetween. Each device 1a, 1b is provided with a ticket inlet slot 2a, 2b and a ticket outlet or return slot 3a, 3b. When arranged in the manner shown in FIG. 1, the slots 2a and 3a of the device 1a are oppositely positioned to the slots 2b and 3b of the other device 1b. Passengers passing through the gateway in the direction a are expected to use the device 1a, while those passing therethrough in the opposite direction b, the device 1b.

In the opposed side walls of the two devices 1a and 1b, there are provided light projectors 5a and 5b near the ticket insertion slots 2a and 2b and light detectors 6a and 6b near the ticket return slots 3a and 3b, so arranged that the light beams 4a and 4b from the projectors 5a and 5b on the devices 1a and 1b, respectively, are normally incident on the detectors 6b and 6a of the opposite devices, respectively. The two beams are successively and momentarily intercepted by a passenger passing through the gate.

The interior mechanisms of the two devices 1a and 1b are substantially the same. In the following description, the device 1b will be taken for example. As shown in FIG. 2, just inside the ticket insertion slot 2b, there is provided a genuineness tester 7b. As a test of genuineness, tickets usable with the device may have a particular metallic object embedded or a hole punched out at a predetermined location thereof. When the tester 7b electrically or optically detects such an embedded metallic object or punched hole, it produces an output signal, which energizes a solenoid 9. A plunger 9' is attached to one arm of a bell-crank lever 10, the other arm of which supports a free roller 12. A drive roller 13 is disposed adjacent the tester 7b to receive a ticket therefrom. The lever 10 is pivoted at 11 and spring-biased as at 10' so as to normally hold the plunger 9' pulled out of the solenoid 9 on one hand and the roller 12 spaced apart from the drive roller 13 on the other.

When the solenoid 9 is energized by the output signal from the tester 7b which has recognized a genuine ticket, the plunger 9' is pulled in so as to pivot the lever 10 counterclockwise in FIG. 2 until the roller 12 touches on the drive roller 13, thereby sandwiching the inserted ticket therebetween. The drive roller 13 may be either always rotating or actuated by the output of the tester 7b to rotate, clockwise so that the ticket is drawn in. The ticket 8 is thence passed through a ticket information reader 16b by a pair of drive rollers 14 and a pair of free rollers 15 bearing thereon onto a conveyor belt 17. The rollers 14 are ganged with the drive roller 13.

The ticket has various information such as ticket value, passenger origin, destination, the term of availability, etc. magnetically or otherwise recorded thereon. The information is read by the ticket reader and then tested with respect to its validity. If the ticket is valid, a "valid ticket"

signal is produced, while if it is invalid, an "invalid ticket" signal is produced.

The belt 17 is endless, passing around pulleys 18 and 19, with a tension roller 20 bearing against the belt 17. The belt may preferably have a plurality of projections 17a (FIG. 3) formed all over its outer surface to prevent slipping of tickets thereon. The pulleys 18 and 19 are ganged with the roller 13, so that the belt is driven in the direction c.

Below the ticket return slot 3b there is provided a guide plate 23 with its lower edge positioned above the rear end of the extension of the endless belt 17, so that tickets on the belt successively run on the plate 23 so as to be piled up thereon one upon another in the order they were inserted through the slot 2b. A roller 22 faces the guide plate 23 a suitable distance therefrom to enable a desired number of tickets to be piled up in the gap.

As passengers who have inserted their tickets successively come near the return slot 3b, the tickets piled up on the guide plate 23 are dispensed out from the slot 3b in succession from the lowest one first, that is in the order they were inserted in the inlet slot 2a. This is effected by the following mechanism and in the following manner: When the passenger momentarily intercepts the light beam 4a incident on the detector 6b, a signal is produced so that a solenoid 24 is energized. A plunger 24' is fixed to one arm of a bell-crank lever 27, the other arm of which carries a rotatable shaft 25a having a pulley 25 and a friction roller 25b (FIG. 4) fixed thereto for rotation therewith. The lever 27 is spring-biased as at 27' and pivotally supported by a rotatable shaft 28, which has a pulley 28a fixed thereto for rotation therewith. An endless belt 26 passes around the pulleys 25 and 28a and is driven in the direction d in FIG. 2, so that the friction roller 25b is rotated in the same direction.

Figure 4:
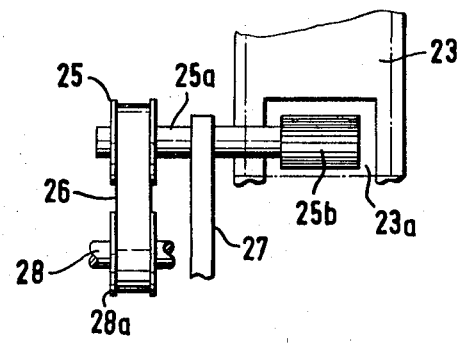
FIG. 4 shows a portion of FIG. 3 as viewed from the right-hand side of FIG. 3.

When the solenoid 24 is energized, the plunger 24' is pulled in so as to pivot the lever 27 counterclockwise in FIG. 2 against the force of the spring 27'. As shown in FIG. 4, the guide plate 23 is formed with an opening 23a at such a location that upon counterclockwise pivotal movement of the lever 27, the friction roller 25b is moved into opening 23a of the guide plate 23 until it cooperates with the fixed roller 22 to sandwich the piled tickets on the guide plate therebetween. Under the condition, the roller 25b frictionally contacts the under surface of the lowest ticket in the pile, that is the ticket that was the first to to be inserted into the slot 2a, and as the roller 25 is rotating, it moves that ticket upward until the ticket has its lower edge resting on a shoulder 23b formed intermediate the guide plate 23. The shoulder 23b is located at such a height that the ticket resting thereon has its upper portion projecting out of the return slot 3b. Then the passenger who inserted that ticket into the inlet slot 2b may simply pick it up.

Figure 5:
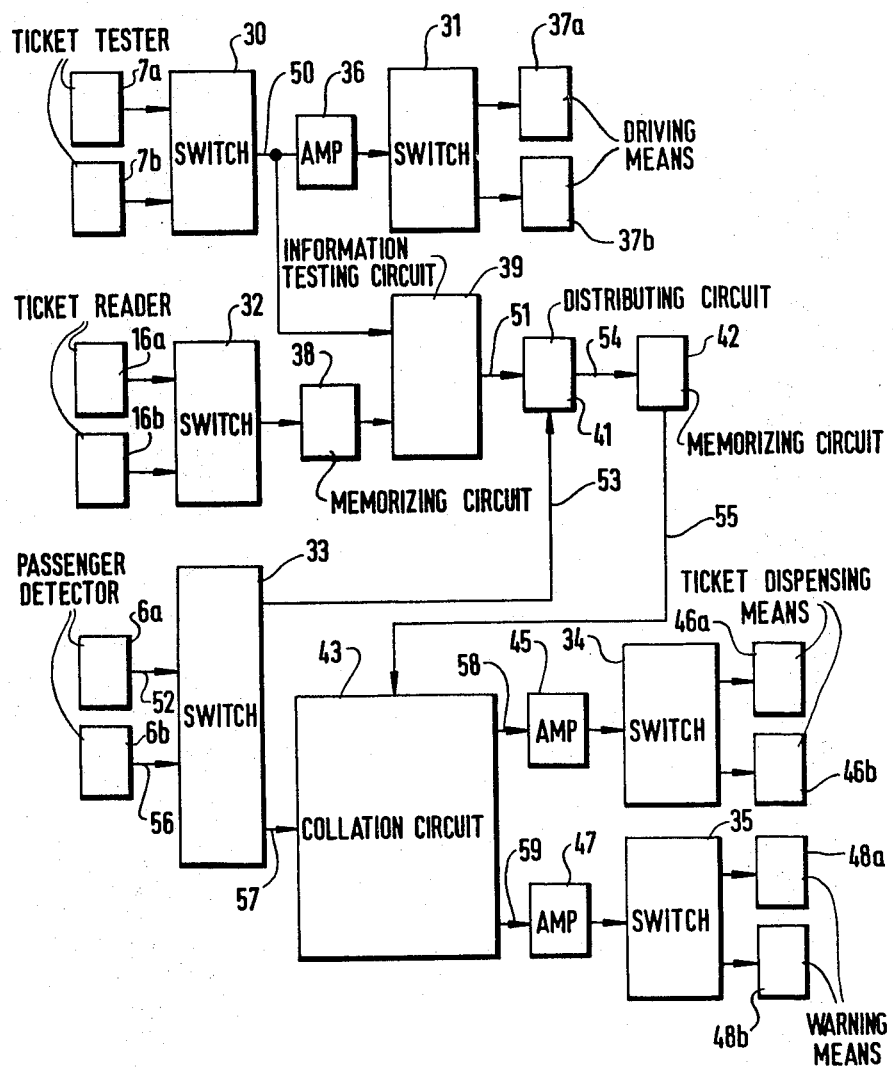
FIG. 5 is a block diagram of the electrical control system of the apparatus of the invention.

The electrical control system of the invention will now be described with reference to FIG. 5, wherein the reference numerals with suffixes a and b designate the components belonging to the devices 1a and 1b, respectively. As previously mentioned, the devices 1a and 1b serve those passengers who come in the opposite directions a and b, respectively. Therefore, if the gate is to be set for those passengers coming in the direction a, the device 1a must work, while if it is to be set for those coming in the direction b, the opposite device 1b must work. Selection between the two is effected by switching means 30–35 inserted in various places in the control system. It is assumed in the following description that the gate is set for those passengers coming in the direction b, and that the switches 30–35 are positioned so that the device 1b operates.

If a genuine ticket has been inserted through the slot 2b, the tester 7b produces an output, which appears on a line 50 through the switch 30. The signal is applied to an amplifier 36, the output of which is applied through the switch 31 to a driving means 37b which includes the solenoid 9 of the device 1b. The signal on the line 50 is also applied to an information testing circuit 39, which includes a bistable device, such as a flip-flop providing set and reset output states in response to set and reset input signals, which stores the signal on line 50. When the solenoid 9 is energized, the ticket is drawn in by the rollers 12 and 13 onto the ticket reader 16b, as previously mentioned, which reads the information on the ticket and applies corresponding signals to an information memorizing circuit 38 where the information that has been read from the ticket is memorized. Solenoid 9 is maintained in an energized condition by a timer in driving means 37b for a fixed time interval after the occurrence of a signal on line 50. The time interval is determined by considering the speed at which the ticket is pulled into the inlet 2b and the average time for a passenger to pass through the automatic ticket gate. Circuit 38 provides temporary storage for the ticket information until all pertinent data has been read by ticket reader 16b. Accordingly, circuit 38 may comprise any resettable register. The memorized information is then applied to the testing circuit 39, wherein with the prior application thereto of the signal from the line 50, the information is tested with respect to its validity by collating the information with the proper reference information memorized in the circuit 39 beforehand. Information testing circuit 39 may to this end additionally comprise a diode matrix such as illustrated in FIGS. 5 and 6 of U.S. Pat. 3,457,391, to Minitaka Yamamoto which is entitled, "Vending Apparatus for Use with Credit Cards."

If the ticket is recognized as valid, the circuit 39 produces a "valid ticket" signal on a line 51, while if the ticket is invalid, the circuit 39 produces an "invalid ticket" signal on the same line. If no ticket is inserted, the circuit 39 produces "no ticket" signal on the line 51. The signal on the line 51 is applied to a distributing circuit 41 which may be a simple AND gate.

The passenger who inserted the ticket into the slot 2b first intercepts the light beam 4b, whereupon the detector 6a produces a signal on a line 52 to be applied through the switch 33 and a line 53 to the circuit 41. Thus, the circuit 41 receives two input signals. If the circuit receives a signal from the line 53 and "no ticket" signal from the line 51, the condition means that the passenger who blocked the light beam 4b has slipped no ticket into the slot 2b. Then, the circuit 41 produces a "no ticket inserted" signal on a line 54, which is memorized by a memorizing circuit 42. When the circuit 41 receives an 'invalid ticket" signal from the line 51 as well as a signal from the line 53, an "invalid ticket inserted" signal appears on the line 54, so that the circuit 42 memorizes the condition that the inserted ticket is invalid. If the signal on the line 51 is a "valid ticket" signal, accompanied by a signal applied from the line 53, the circuit 42 memorizes the condition that the ticket is valid.

The circuit 42 is so arranged as to be able to memorize such conditions or information as mentioned above with respect to the individual passengers who have come in the gate and that in the order they came in, and to apply the information through a line 55 to a collation circuit 43 in the order they were memorized. Circuit 42 may thus comprise a shift register capable of retaining three logic signals in the order of entry. As previously mentioned, the tickets that were inserted through the slot 2b are piled up on the guide plate 23 one upon another in the order they were inserted. The signal on line 53 is also used to reset the register in memorizing circuit 38 and the bistable device in information testing circuit 39, thus allowing another passenger to insert his ticket in the inlet 2b.

When, after passing the first light beam 4b, the passenger further advances through the gateway as far as to intercept the second light beam 4a, the detector 6b produces a signal on a line 56, which is applied through the switch 33 and a line 57 to the collation circuit 43. It should be recalled that when the same passenger previously intercepted the first light beam 4b, the detector 6a produced a signal on the line 53, so that the circuit 42 now applies to the collation circuit 43 a signal corresponding to the information which the circuit 42 memorized about the same passenger, that is, whether he inserted a ticket or not, or whether his ticket is valid or invalid. Thus the two input signals to the circuit 43 are caused by the same passenger. In concurrence with the signal from the line 57, if the signal from the line 55 is a "valid ticket inserted" signal, the circuit 43 produces a signal on a line 58, which is applied to an amplifier 45, the output of which is applied through the switch 34 to a ticket dispensing means 46b. If the signal from the line 55 is an "invalid ticket inserted" signal, the circuit 43 produces a signal not only on the line 58, thereby projecting the ticket out of the slot 3b, but also on a line 59. The signal on the line 59 is applied to an amplifier 47, the output of which is applied through the switch 35 to a warning means 48b, which may be a buzzer, lamp and/or a barrier bar. If the signal from the line 55 is a "no ticket inserted" signal, the circuit 43 produces a signal on the line 59 only and not on the line 58, so that the warning means 48b is operated. Collation circuit 43 may thus comprise first and second bistable devices providing, respectively, output signals on lines 58 and 59, and a logic network, preferably two OR gates, appropriately directing the signals on line 55 to the input of the first and second bistable devices in accordance with the operation heretofore described.

Thus, in accordance with the invention, the tickets that have been inserted into the machine are successively returned to the individual passengers who have inserted them, with a warning against passage of those who have used false or invalid tickets, or no ticket at all.

Having illustrated and described one preferred embodiment of the invention, it is understood that there are many changes and modifications without departing from the scope of the invention as defined in the appended claims. For example, the passenger detectors may also be of a electrical or mechanical type; the ticket tester may be of a type which detects the insertion of tickets and not their genuineness; the ticket reader may be positioned adjacent the return slot or intermediate the conveyor belt; and the ticket storing guide plate may be positioned at any other suitable places than the rear end of the belt extension. Also, a turnstile may be used, operable in response to the signal on the line 59.

What we claim is:

1. An automatic ticket gate for a railway station and the like operable in response to tickets successively inserted thereinto to control passage through the gate, comprising: a structure defining a gateway at one side thereof and having a substantial length therealong; a first slot formed in said structure at one end of the extension thereof for tickets to be inserted therethrough; means provided adjacent said first slot for detecting each ticket inserted through said slot; means provided adjacent said first slot for detecting passage of passengers thereby; a second slot from which said tickets are dispensed, said second slot being formed at the other end of the extension of said structure; means for conveying said tickets from said first to second slots; means for momentarily storing said tickets being conveyed by said conveying means, in the order they were inserted through said first slot; means for reading the information recorded on each said ticket; means for testing the validity of said information of each said ticket; means provided adjacent said second slot for detecting passage of said passengers thereby; means operable in response to said ticket detecting means, said first passenger detecting means and said ticket validity testing means to memorize whether a ticket is inserted or not, and whether the ticket inserted is valid or invalid with respect to each said passenger; means operable in response to said second passenger detecting means and said memorizing means to dispense said stored tickets through said second slot one after another in the order they were stored when insertion of a ticket into said first slot by a passenger who is detected by said second passenger detecting means is memorized in said memorizing means.

2. The automatic ticket gate as defined in claim 1, further including: means operable in response to said memorizing means and said second passenger detecting means to provide a signal when no insertion of a ticket by the passenger who is detected by said second passenger detecting means is memorized in said memorizing means and when the ticket inserted by the passenger who is detected by said second passenger detecting means is not valid; and means operable in response to said last-mentioned signal to prevent passage of said passenger through said gateway.

3. The automatic ticket gate as defined in claim 1, wherein said ticket detecting means also tests the genuineness of said inserted tickets.

4. The automatic ticket gate as defined in claim 2, wherein said passage preventing means is a barrier bar.

5. The automatic gate as defined in claim 2, wherein said passage preventing means is a turnstile.

6. The automatic ticket gate as defined in claim 2, wherein said passage preventing means provides an acoustic warning.

7. The automatic ticket gate as defined in claim 2, wherein said passage preventing means provides a visual warning.

8. The automatic ticket gate as defined in claim 1, wherein said ticket conveying means includes an endless belt passing around a pair of pulleys disposed adjacent said first and second slots and having a plurality of projections formed all over its outer surface.

9. The automatic ticket gate as defined in claim 8, wherein said ticket storing means comprises a guide plate disposed adjacent said conveyor belt so that said tickets on said belt successively run on said guide plate to be piled up thereon one upon another in the order they were inserted through said first slot.

10. The automatic ticket gate as defined in claim 9, wherein said ticket dispensing means includes a friction roller disposed adjacent said guide plate and being operable in response to said second passenger detecting means to come into rotating frictional contact with the one of said tickets on said guide plate that was first to be stored thereon, so that said one ticket is moved by said rotating roller through said second slot.

References Cited

UNITED STATES PATENTS 1,998,320   4/1935   Johnson _____ 232—8
3,221,304   11/1965   Enikeieff _____ 340—149

MAYNARD R. WILBUR, Primary Examiner

T. J. SLOYAN, Assistant Examiner

U.S. Cl. X.R.

194—4; 232—8; 340—149